US012602934B2

(12) United States Patent
Mathur et al.

(10) Patent No.: US 12,602,934 B2
(45) Date of Patent: Apr. 14, 2026

(54) VEHICULAR DRIVING ASSIST SYSTEM WITH TRAFFIC LIGHT RECOGNITION

(71) Applicant: Magna Electronics Inc., Auburn Hills, MI (US)

(72) Inventors: Dhruv Mathur, Troy, MI (US); Tejas Murlidhar Varunjikar, Troy, MI (US); Nidhip Naik, Troy, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 57 days.

(21) Appl. No.: 18/754,270

(22) Filed: Jun. 26, 2024

(65) Prior Publication Data

US 2025/0005936 A1     Jan. 2, 2025

Related U.S. Application Data

(60) Provisional application No. 63/510,904, filed on Jun. 29, 2023.

(51) Int. Cl.
| | |
|---|---|
| *G06V 20/58* | (2022.01) |
| *B60Q 9/00* | (2006.01) |
| *B60R 11/04* | (2006.01) |

(52) U.S. Cl.
CPC ............. *G06V 20/584* (2022.01); *B60Q 9/00* (2013.01); *B60R 11/04* (2013.01)

(58) Field of Classification Search
CPC .......... G06V 20/584; B60Q 9/00; B60R 11/04
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |
| 7,038,577 B2 | 5/2006 | Pawlicki et al. |
| 7,466,227 B2 | 12/2008 | Chen et al. |
| 7,720,580 B2 | 5/2010 | Higgins-Luthman |
| 7,855,755 B2 | 12/2010 | Weller et al. |
| 8,773,281 B2 | 7/2014 | Ghazarian |
| 9,036,026 B2 | 5/2015 | Dellantoni et al. |
| 9,126,525 B2 | 9/2015 | Lynam et al. |
| 9,153,128 B2 | 10/2015 | Holzwanger et al. |
| 9,214,084 B2 | 12/2015 | Grauer et al. |
| 9,729,636 B2 | 8/2017 | Koravadi et al. |
| 9,881,220 B2 | 1/2018 | Koravadi |

(Continued)

*Primary Examiner* — James M Pontius
(74) *Attorney, Agent, or Firm* — HONIGMAN LLP

(57) ABSTRACT

A vehicular vision system includes a camera disposed at a vehicle and viewing at least forward of the vehicle. The vehicular vision system, as the vehicle travels along a traffic lane of a road and via processing of image data captured by the camera and based on map data, determines presence of a plurality of traffic lights at an intersection and identifies a target traffic light from the plurality of traffic lights that is associated with the traffic lane along which the equipped vehicle is traveling as the vehicle approaches the intersection. The vehicular vision system determines, via processing of image data captured by the camera, status of the identified target traffic light. The vehicular vision system, responsive to determining the status of the identified target traffic light, alerts a driver of the vehicle of the status of the relevant traffic light and/or controls speed of the vehicle.

30 Claims, 3 Drawing Sheets

(56)  References Cited

U.S. PATENT DOCUMENTS

| | | | |
|---|---|---|---|
| 9,881,501 B2 | 1/2018 | Weber | |
| 9,900,490 B2 | 2/2018 | Ihlenburg et al. | |
| 10,071,687 B2 | 9/2018 | Ihlenburg et al. | |
| 10,099,614 B2 | 10/2018 | Diessner | |
| 10,607,094 B2 | 3/2020 | Kunze et al. | |
| 11,055,991 B1 * | 7/2021 | Mulligan | G08G 1/091 |
| 2015/0210312 A1 * | 7/2015 | Stein | B60T 7/12 |
| | | | 701/41 |
| 2016/0318490 A1 * | 11/2016 | Ben Shalom | B60T 7/22 |
| 2024/0203244 A1 * | 6/2024 | Debnath | G06V 10/764 |

* cited by examiner

Wrong structure picked using FCM-only approach

VEHICULAR DRIVING ASSIST SYSTEM WITH TRAFFIC LIGHT RECOGNITION

CROSS REFERENCE TO RELATED APPLICATION

The present application claims the filing benefits of U.S. provisional application Ser. No. 63/510,904, filed Jun. 29, 2023, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular vision system includes a camera disposed at a vehicle equipped with the vehicular vision system that views at least forward of the equipped vehicle. The camera is operable to capture image data. The camera includes a CMOS imaging array with at least one million photosensors arranged in rows and columns. The system includes an electronic control unit (ECU) with electronic circuitry and associated software. Image data captured by the camera is transferred to the ECU. The electronic circuitry of the ECU includes at least one image processor and the ECU is operable to process image data captured by the camera and transferred to the ECU. As the vehicle travels along a traffic lane of a road, the vehicular vision system, (i) via processing at the ECU of image data captured by the camera and (ii) based on map data, determines presence of a plurality of traffic lights at an intersection that the equipped vehicle is approaching. Each traffic light of the plurality of traffic lights is associated with one or more traffic lanes of the road at the intersection. The vehicular vision system, based at least in part on (i) map data and (ii) processing at the ECU of image data captured by the camera, identifies a target traffic light from the plurality of traffic lights that is associated with the traffic lane along which the equipped vehicle is traveling as the vehicle approaches the intersection. The vehicular vision system determines a status of the identified target traffic light via processing at the ECU of image data captured by the camera. The vehicular vision system, responsive to determining the status of the identified target traffic light, at least one selected from the group consisting of (i) alerts a driver of the equipped vehicle of status of the target traffic light and (ii) controls speed of the equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
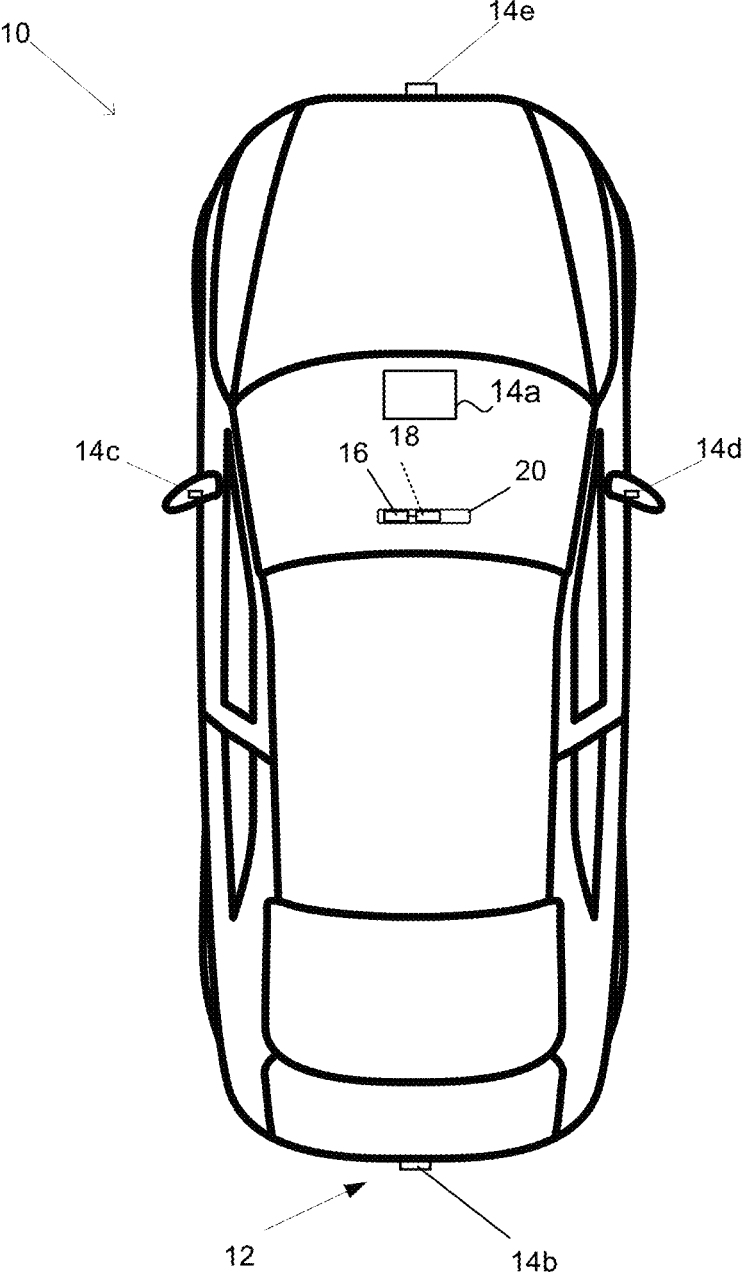
FIG. 1 is a plan view of a vehicle with a vision system that incorporates cameras.

Referring now to the drawings and the illustrative embodiments depicted therein, a vehicle 10 includes an imaging system or driving assist system or sensing system 12 that includes at least one exterior viewing imaging sensor or camera, such as a front camera module (FCM) or forward viewing imaging sensor or camera 14a (e.g., disposed at the windshield of the vehicle and viewing at least forward of the vehicle through the windshield), which captures images exterior of the vehicle, with the camera having a lens for focusing images at or onto an imaging array or imaging plane or imager of the camera (FIG. 1). Optionally, the forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). Optionally, the system may include multiple exterior viewing imaging sensors or cameras, such as a rearward viewing camera 14b, a sideward/rearward viewing camera 14c, 14d at respective sides of the vehicle, and/or a front viewing camera 14e. The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Advanced Driver Assistance Systems (ADAS) are designed to assist drivers in performing various driving tasks safely and comfortably. By utilizing a combination of sensors such cameras and/or radar sensors (e.g., the sensing system 12), the ADAS can perceive the environment around the equipped vehicle and provide real-time information to the driver or perform a task as needed, depending on the specific functionality of each feature of the ADAS. An exemplary feature for some ADAS is traffic light recognition, which utilizes sensor inputs (e.g., one or more cameras or other image sensors) to detect traffic lights and assist the driver in slowing down the vehicle when approaching an intersection equipped with a traffic light. This feature improves safety and reduces the risk of accidents by ensuring that drivers have accurate and timely information about traffic light status (e.g., the color or status of the traffic light), enabling the driver to make informed decisions about when to slow down or stop the vehicle.

When driving a vehicle without a traffic light recognition system and approaching an intersection, the driver must make several decisions based on the traffic light color/status and stop line position (i.e., the line or marking the vehicle is to stop at prior to entering the intersection). For example, the driver must determine how much to decelerate, when to decelerate, how fast to decelerate, and more. The driver must also take corrective action if the vehicle does not behave as expected due to various vehicle and road conditions. For the traffic light recognition system to have similar functionality, it uses sensors (e.g., the front camera 14a) to determine the presence and status of a traffic light ahead of the vehicle. The system may also consider various parameters to determine the desired speed of the vehicle and provide a deceleration command (if warranted). Additionally, the traffic light recognition system may account for operating conditions and interact with the driver through a human-machine interface (e.g., the display device 16 or other display, such as a head-up display (HUD) or the like) to convey traffic light information.

Additionally, with the increasing development of autonomous vehicles, it is crucial to determine the right traffic light structure for a vehicle approaching an intersection. The selection of the appropriate traffic light structure (e.g., vertical layout, horizontal layout, two signal indicators, three signal indicators, four signal indicators, etc.) can significantly impact the safety and efficiency of the vehicle's navigation through the intersection. Hence, it is essential to develop a decision-making system that considers factors (e.g., the road topology/curvature and the stopping distance, current environmental conditions, traffic conditions, etc.) to determine the relevant structure and response based on inputs from sensors in addition to a front camera.

Implementations herein include a vehicular vision system or a vehicular driving assist system or vehicular sensing system that includes traffic light recognition features. The system determines, based at least on sensor data, the most relevant traffic structure for a traffic light a vehicle equipped with the system is approaching based on, for example, a front camera module, map data, and/or other sensor data. The system may provide appropriate warnings and/or deceleration while approaching an intersection with traffic lights. The system ensures comfort for passengers by limiting the maximum allowable jerk (i.e., from rapid changes in acceleration), reducing the risk of accidents, and providing an overall more comfortable driving/riding experience. Conventional systems use only vision-based decision making, which may not be sufficiently robust for this purpose. For example, using only a front camera limits the system to picking the most relevant structure based on the closest structure laterally and longitudinally to the equipped vehicle. In contrast, the system herein provides an accurate visual representation of the most relevant traffic light based on relevancy determinations made using both location-based data (e.g., a global positioning system (GPS) sensor and offline map data) and an image sensor (e.g., an FCM). The system may provide many forms of response to a determined traffic light, such as a red light warning, a green light chime, one or more audible/haptic warnings, and/or actuation requests.

To make more accurate and informed determinations about navigating through intersections safely and efficiently, the system considers both location-based information and real-time sensor input. Map data (e.g., offline map data retrieved from a database stored at the vehicle/user device in communication with the vehicle or real-time map data retrieved via wireless communication from a remote server) provides the system information about an upcoming intersection before the image sensor (e.g., the front camera 14a) can detect the traffic light with high confidence. For example, the map data may provide intersection data before the intersection is within the field of view of the camera or before the camera can view the intersection with sufficient resolution to determine traffic light structure. Thus, the system may begin arbitration for notifications and deceleration sooner, which allows for a safe and comfortable stop at an upcoming red light. The map data assists the system in determining an appropriate stopping distance and evaluating the amount of time remaining until the equipped vehicle 10 will enter the upcoming intersection (e.g., until the front camera 14a detects a stop line associated with the upcoming intersection). Moreover, additional information coming from map data for precise positional information for traffic lights and other traffic control structures can be used for improving the feature fidelity and reducing false positive rates.

The system provides accurate notifications/requests to the driver by determining the most relevant traffic light to the vehicle (i.e., relative to the traffic lane the vehicle is traveling along). The system determines which traffic light is most relevant to the equipped vehicle 10 based on one or more image sensors (e.g., the front camera 14a) and the vehicle's current geographical location relative to map data. That is, the system may determine the appropriate or relevant traffic light for the traffic lane along which the vehicle is traveling (to avoid focusing on, for example, a traffic light for a left turn lane when the vehicle is traveling along a traffic lane that goes straight through the intersection). The system may use any number of sensors (such as surround view cameras) to determine the current lane the vehicle is traveling along. For example, the system may determine or detect lane markers for each lane along the road the vehicle is traveling to determine the current traffic lane the vehicle is traveling along. Map data/positional information may be used in addition to or in lieu of additional sensor data to determine the current traffic lane.

Responsive to determining the relevant traffic light status and traffic light structure, the system may provide one or more notifications and/or decelerate the equipped vehicle 10 while approaching the intersection with the traffic light. The system provides comfort to occupants of the equipped vehicle 10 by limiting erratic vehicular maneuvers, reducing the risk of accidents, and providing a more comfortable driving experience.

Figure 2:
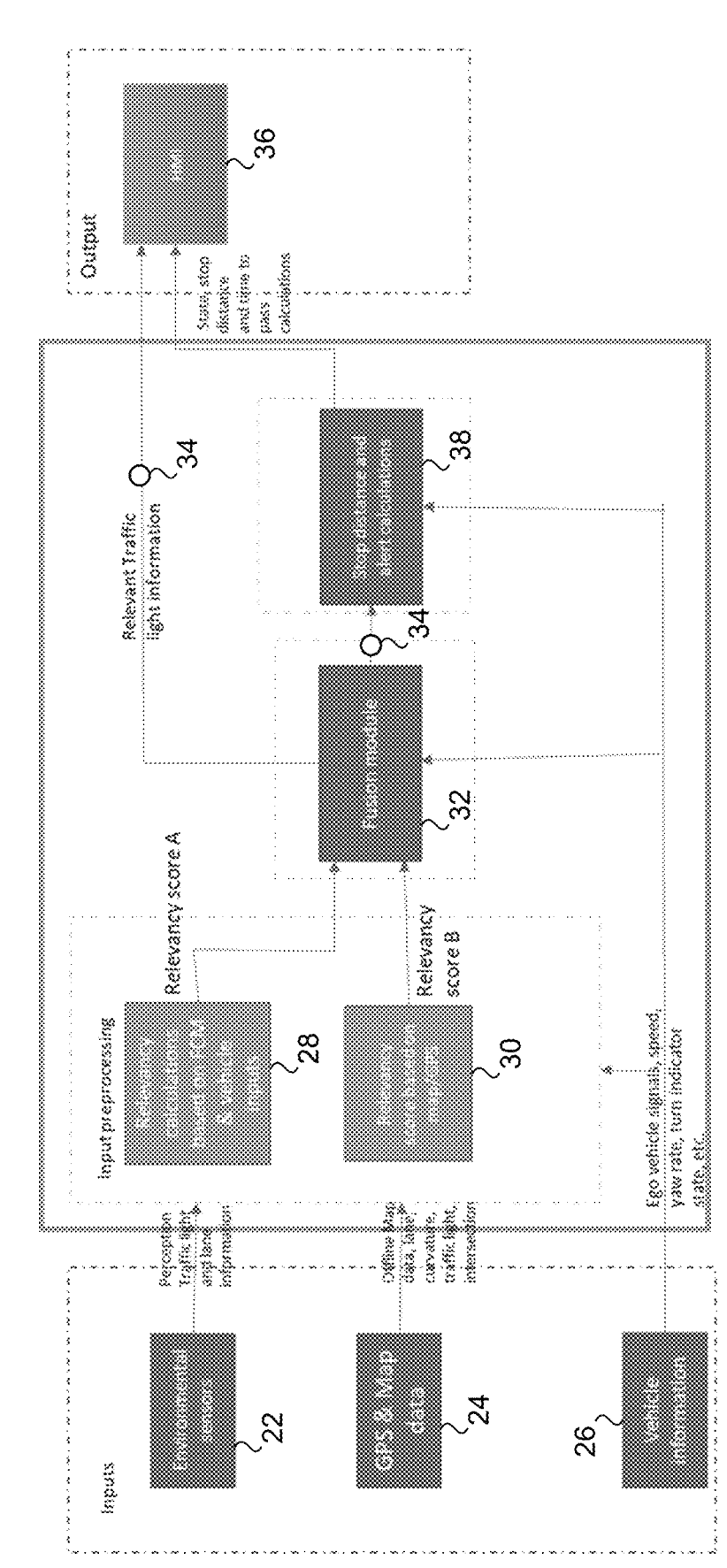
FIG. 2 is a block diagram of a traffic light recognition system that uses the vision system of FIG. 1.

Referring now to FIG. 2, the system 12 receives information from environmental sensors 22 (e.g., one or more cameras, radar sensors, lidar, etc.), GPS and map data 24 (e.g., a current geographical position of the vehicle relative to offline or online map data from a database), and vehicle information 26 (e.g., current vehicle yaw state, vehicle speed, turn indicator state, etc.). The system 12 may determine a first relevancy score 28 based on data from the environmental sensors 22 and a second relevancy score 30 based on the GPS and map data 24. The first relevancy score 28 represents traffic light information (e.g., configuration, status, etc.) determined from the environmental sensors 22. The second relevancy score 30 represents traffic light information determined from the GPS and map data 24. When determining the first relevancy score 28, the system 12 may combine the environmental sensor data with vehicle information 26 such as vehicle speed, yaw rate, or other vehicle dynamics data.

A fusion module 32 may determine an aggregated relevancy score 34 based on the first relevancy score 28 and the second relevancy score 30. For example, the fusion module may use a filter, such as a Kalman filter or the like, to fuse or otherwise aggregate the first relevancy score 28 and the second relevancy score 30. Each relevancy score may be assigned a configurable weight based on any number of factors (e.g., a confidence threshold, environmental factors, specifications of the sensors, etc.). Determining an aggregate relevancy score 34 enables the system 12 to provide more accurate and timely notifications, reduce the risk of accidents, improve the overall driving experience for passengers, and prevent false traffic light identifications by combining information provided by both the environmental sensors 22 and the GPS and map data 24.

Optionally, the fusion module 32 additionally fuses information relating to the number of lanes in the driving direction (or other lane information) for the road the vehicle is traveling along. For example, lane information such as the lane width and road edge information from the front camera module (or other sensors, such as one or more surround view cameras) can be used to improve feature fidelity for assigning detected traffic structures for specific lanes and for improving performance in detecting turn-lane traffic light scenarios. This enables the system to create a more accurate picture or scene of the lane topology with respect to the position of the vehicle and to reduce/eliminate false positives or false negatives for turn-lane scenarios.

The system 12 may provide (e.g., the fusion module 32 may generate) the aggregated relevancy score 34 (based on relevant traffic light information) to the human-machine interface 36 (e.g., one or more displays disposed within the vehicle). Additionally or alternatively, the system 12 may use the aggregated relevancy score 34 and vehicle information 26 to determine or calculate an appropriate stopping distance and to determine an appropriate alert (see block 38 in FIG. 2). The system 12 may output the stop distance and/or notifications 38 to the human-machine interface 36, which may be provided visual, audible, and/or haptic notifications to one or more occupants of the vehicle.

The environmental sensors 22 may include, for example, a forward viewing camera (e.g., the front camera 14a), one or more radar sensors (such as a forward viewing radar sensor or corner radar sensor or the like), one or more lidar sensors, or any other applicable image sensor. The image sensor captures real-time image data (i.e., images or video frames) of at least the road ahead of the equipped vehicle, including traffic lights/structures that the vehicle is approaching. The system 12 processes the captured image data to determine the location, structure, and status (e.g., on/off, flashing, color of light emitted) of one or more traffic lights ahead of the vehicle, allowing the vehicular vision system 12 to make determinations regarding the navigation of upcoming intersections. The environmental sensors 22 may also capture data regarding longitudinal distance and lateral distance of the traffic light relative to the equipped vehicle 10, as well as traffic lane and intersection information such as the road edge location, number of traffic lanes, lane width, etc. The traffic lane information can help the system 12 assign detected traffic structures to specific traffic lanes and improve performance in determining turn-lane-specific traffic lights by creating a more accurate picture of the traffic lane topology with respect to the equipped vehicle 10.

The map data 24 may include offline map data (e.g., stored at memory hardware of the equipped vehicle) and current vehicle geographical position from a GPS sensor or other location sensor. The map data may also be retrieved in real-time from a communication interface. For example, the system may retrieve the map data from a user device (e.g., a smartphone) of an occupant of the vehicle or via a remote server accessed via the Internet. The map data 24 may further include information regarding the upcoming intersection, including traffic light information (e.g., number, type, and/or location of traffic lights) and longitudinal distance between the upcoming intersection and the equipped vehicle 10. The map data 24 may include information regarding curvature of a road, waypoints, number of lanes, lane width, and other lane information. The GPS and map data 24 collectively provide e-horizon information. The system 12 may use the e-horizon information with information or sensor data captured by the sensors 22 to ensure that inputs are stabilized and dependable. Combining the sensor data from the environmental sensors 22 with the map data 24 supplements captured image data (e.g., from the front camera 14a).

Figure 3:
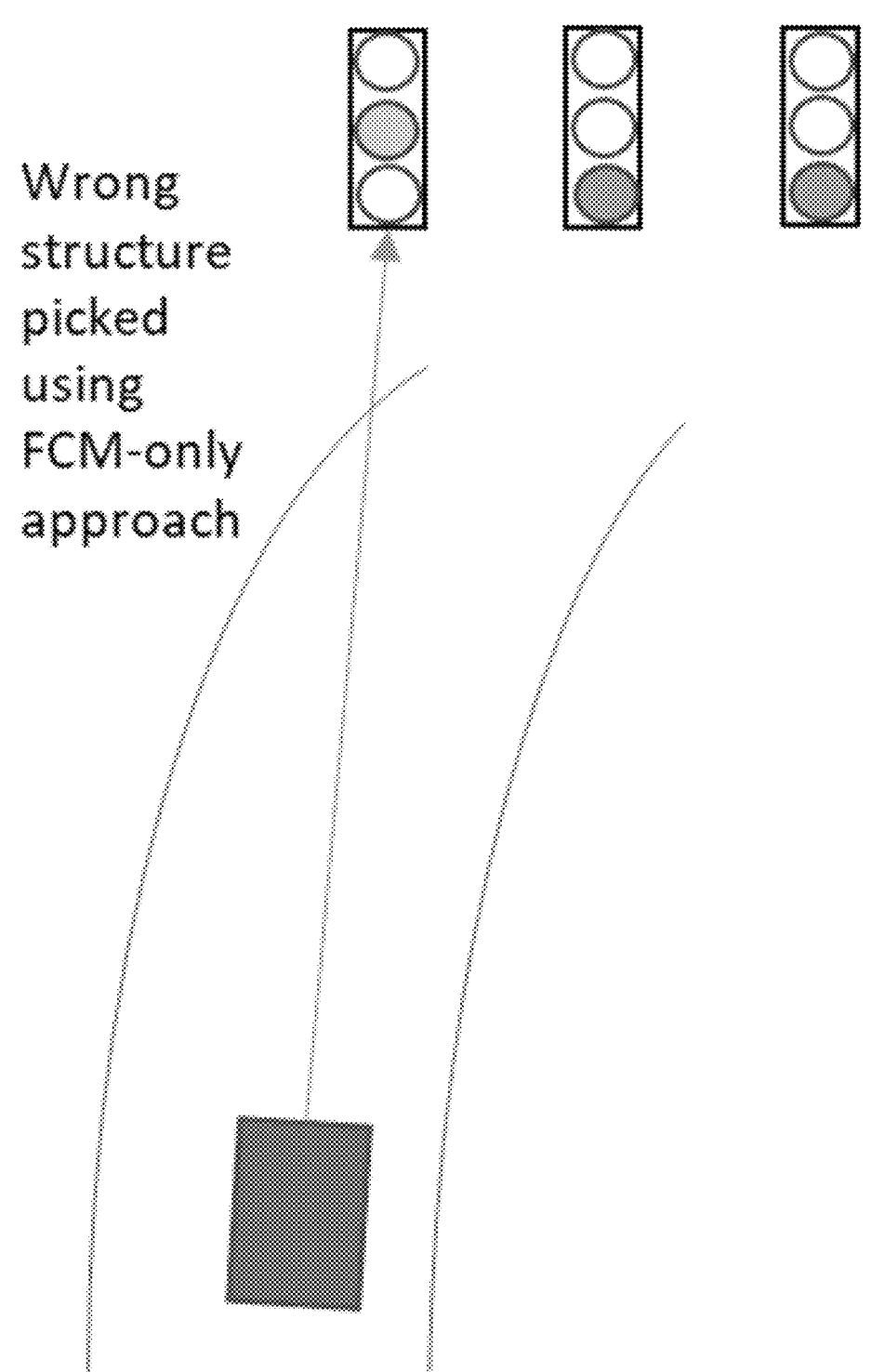
FIG. 3 is a schematic view of a curved road scenario for a vision system of a vehicle.

Referring now to FIG. 3, the vehicular vision system 12 optionally determines curvature of the traffic lane the equipped vehicle is traveling along based on the map data 24 and, for example, intersection information. This reduces the impact of false positives/determinations, such as ghost structures or erroneous identifications of a traffic light using data from the environmental sensors 22. Determining the curvature of the road further allows the system 12 to better determine the traffic light most relevant to the equipped vehicle 10 (i.e., relative to the current traffic lane). For example, as shown in FIG. 3, road curvature can cause traditional techniques (i.e., techniques that rely solely on an image sensor, such as an FCM) to assign the incorrect traffic light to the traffic lane the vehicle is traveling along. Specifically, in this example, an intersection has three traffic lights, each governing a different lane of the road. Here, an image sensor may assign the left-most traffic light (which may be a traffic light for a left turn lane of the intersection) as the most relevant to the vehicle while, due to road curvature, the center traffic light (which may be a traffic light for a non-turning traffic lane of the intersection) is actually the most relevant to the vehicle (i.e., the center traffic light governs the intersection for the lane the vehicle is currently traveling along). That is, for some traffic scenarios (e.g., curved roads), the valid lane information received from the image sensor (e.g., a camera) may be short in range (longitudinally from the vehicle). By fusing the image data with map data and the vehicle's current location (e.g., via a GPS sensor of the like), such scenarios can be mitigated.

Thus, the system includes an image sensor (e.g., a camera) disposed at a vehicle equipped with the system and viewing exterior of the equipped vehicle. The image sensor captures image data and includes an imager. The imager includes a CMOS imaging array having at least one million photosensors arranged in rows and columns. The system also includes an electronic control unit (ECU) with electronic circuitry and associated software. The electronic circuitry of the ECU may include an image processor for processing image data captured by the camera (e.g., to detect presence of objects in the field of view of the camera). The system, (i) via processing by the image processor of image data captured by the camera and (ii) based on map data (e.g., responsive to determining a position of the equipped vehicle relative to map data), determines presence of a traffic light at an upcoming intersection and identifies the relevant or target traffic light associated with at least a traffic lane the equipped vehicle is traveling along. The system, responsive to identifying the relevant traffic light, may determine, via processing by the image processor of image data captured by the camera, a status of the relevant traffic light (e.g., a color of the traffic light). The system may, responsive to determining the status of the relevant traffic light, alert a driver of the equipped vehicle of the status of the traffic light or control a speed of the equipped vehicle (e.g., acceleration and/or braking). The system may identify the relevant traffic light by determining a first relevancy score based on the image data captured by the camera and determining a second relevancy score based on the map data. For example, the system identifies the target traffic light based on an aggregation or combination of the first relevancy score and the second relevancy score.

The system may determine the first relevancy score further based on a longitudinal and lateral distance of the traffic light at the upcoming intersection from the camera. Optionally, the system may determine the first relevancy score at least partially based on vehicle dynamics data (e.g., vehicle speed, yaw rate, etc.). The system may determine the second relevancy score further based on a global positioning system data. The system may determine a combined or an aggregated relevancy score based on the first relevancy score and the second relevancy score. For example, the aggregated relevancy score may be an average or a weighted average of the first relevancy score and the second relevancy score. The weight may be based on confidence values associated with the first relevancy score and the second relevancy score. For example, a higher weight may be given to the relevancy score associated with a higher confidence score.

The system may determine the second relevancy score based on a longitudinal distance between the equipped vehicle and the upcoming intersection. Optionally, the system may determine the second relevancy score based on the longitudinal distance between the equipped vehicle and the upcoming intersection, and map data information including information regarding waypoints and curvature of a road associated with the traffic lane the equipped vehicle is traveling along.

Optionally, the system may determine topology information based on the image data captured by the camera, and the first relevancy score may be based on the topology information. The system may also determine, based on the aggregated relevancy score and vehicle dynamics data, a stopping distance for the equipped vehicle (e.g., a distance until the vehicle should be stopped before entering the intersection). The system may determine, based on the aggregated relevancy score and vehicle dynamics data, an amount of time remaining until the equipped vehicle will enter the upcoming intersection. The system may determine an amount of time remaining in which the equipped vehicle can enter the upcoming intersection before the color of the illuminated indicator associated with the relevant traffic light changes (e.g., from green to red), and may alert the driver of the equipped vehicle responsive to the determined amount of time (e.g., the system may alert the driver if the determined amount of time remaining is less than a threshold time period, such as, for example, less than 10 seconds or less than 5 seconds or less than 3 seconds).

The system may, responsive to determining the aggregated relevancy score, generate an alert pertaining to the traffic light. The alert may include at least one selected from the group consisting of (i) a visual notification, (ii) an audible notification, and (iii) a haptic notification. The alert may include a visual notification that includes a color of an illuminated signal (or other status, such as an icon, arrow, or other indicator) of the traffic light.

The system may determine a color of an illuminated indicator associated with the relevant traffic light. The system may determine a change in the color of the illuminated indicator associated with the relevant traffic light, and the system may alert the driver of the equipped vehicle responsive to the determined change in color. They system may (i) via processing by the image processor of image data captured by the camera and (ii) responsive to determining the position of the equipped vehicle relative to map data, determine presence of a plurality of traffic lights at the upcoming intersection and may ignore traffic lights that are not determined to be the relevant traffic light associated with at least the traffic lane the equipped vehicle is traveling along.

Similarly, the system may use a fusion of image data captured by a camera and map data to determine speed limits of one or more lanes of a road. For example, the system may use map data to increase a confidence in a current speed limit for the lane the vehicle is traveling along and to prepare the vehicle for slowing/accelerating when an upcoming change in the speed limit is determined. For example, using map data, the system may determine an upcoming speed limit change before the updated speed limit is detected by a camera imaging a speed limit sign. Optionally, for example, the system may utilize map data to determine if the vehicle is approaching a section of a multi-lane road where different speed limits apply to different traffic lanes of the road, and the system may process image data captured by the forward-viewing camera to determine the speed limit for the particular traffic lane along which the vehicle is traveling.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor of the camera may capture image data for image processing and may comprise, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels or at least three million photosensor elements or pixels or at least five million photosensor elements or pixels arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a camera disposed at a vehicle equipped with the vehicular vision system, the camera viewing at least forward of the equipped vehicle;

wherein the camera is operable to capture image data;

wherein the camera comprises a CMOS imaging array, and wherein the CMOS imaging array comprises at least one million photosensors arranged in rows and columns;

an electronic control unit (ECU) comprising electronic circuitry and associated software;

wherein image data captured by the camera is transferred to the ECU;

wherein the electronic circuitry of the ECU comprises at least one image processor;

wherein the ECU is operable to process image data captured by the camera and transferred to the ECU;

wherein, as the vehicle travels along a traffic lane of a road, the vehicular vision system, (i) via processing at the ECU of image data captured by the camera and (ii) based on map data, determines presence of a plurality of traffic lights at an intersection that the equipped vehicle is approaching, and wherein each traffic light of the plurality of traffic lights is associated with one or more traffic lanes of the road at the intersection;

wherein the vehicular vision system, based on processing at the ECU of image data captured by the camera, determines a first relevancy score and a first confidence value associated with the first relevancy score;

wherein the vehicular vision system, based on the map data, determines a curvature of the road;

wherein the vehicular vision system, based on the determined curvature of the road, determines a second relevancy score and a second confidence value associated with the second relevancy score;

wherein the vehicular vision system, based on the first relevancy score and the second relevancy score, determines an aggregated relevancy score by weighting the first relevancy score and the second relevancy score, wherein a higher weight is applied to the first relevancy score or the second relevancy score based on the first confidence value and the second confidence value;

wherein the vehicular vision system, based at least in part on the aggregated relevancy score, identifies a target traffic light from the plurality of traffic lights that is associated with the traffic lane along which the equipped vehicle is traveling as the vehicle approaches the intersection;

wherein the vehicular vision system determines a status of the identified target traffic light via processing at the ECU of image data captured by the camera; and wherein the vehicular vision system, responsive to determining the status of the identified target traffic light, performs at least one selected from the group consisting of (i) alerting a driver of the equipped vehicle of status of the target traffic light and (ii) controlling speed of the equipped vehicle.

2. The vehicular vision system of claim 1, wherein the vehicular vision system determines the first relevancy score based at least in part on (i) a longitudinal distance of the target traffic light from the equipped vehicle and (ii) a lateral distance of the target traffic light from the equipped vehicle.

3. The vehicular vision system of claim 1, wherein the vehicular vision system determines the first relevancy score based at least in part on vehicle dynamics data.

4. The vehicular vision system of claim 1, wherein the vehicular vision system determines the second relevancy score based at least in part on global positioning system data.

5. The vehicular vision system of claim 1, wherein the vehicular vision system determines the second relevancy score based at least in part on a longitudinal distance between the equipped vehicle and the intersection.

6. The vehicular vision system of claim 5, wherein the map data further comprises information regarding waypoints and curvature of the road associated with the traffic lane the equipped vehicle is traveling along.

7. The vehicular vision system of claim 1, wherein the vehicular vision system determines topology information for the traffic lane based on processing at the ECU of image data captured by the camera, and wherein the first relevancy score is further based on the topology information.

8. The vehicular vision system of claim 1, wherein the vehicular vision system determines, based on the aggregated relevancy score and vehicle dynamics data, a stopping distance for the equipped vehicle that will stop the vehicle prior to entering the intersection.

9. The vehicular vision system of claim 1, wherein the vehicular vision system determines, based on the aggregated relevancy score and vehicle dynamics data, an amount of time remaining until the equipped vehicle will enter the intersection.

10. The vehicular vision system of claim 9, wherein the vehicular vision system determines an amount of time remaining in which the equipped vehicle can enter the intersection before color of an illuminated indicator associated with the identified target traffic light changes, and wherein the vehicular vision system, responsive to the determined amount of time being less than a threshold time period, alerts the driver of the equipped vehicle.

11. The vehicular vision system of claim 1, wherein the alert comprises at least one selected from the group consisting of (i) a visual notification, (ii) an audible notification and (iii) a haptic notification.

12. The vehicular vision system of claim 11, wherein the alert comprises the visual notification, and wherein the visual notification includes a color of an illuminated indicator of the identified target traffic light.

13. The vehicular vision system of claim 1, wherein the vehicular vision system determines a color of an illuminated indicator associated with the identified target traffic light.

14. The vehicular vision system of claim 13, wherein the vehicular vision system determines a change in color of the illuminated indicator associated with the identified target traffic light, and wherein the vehicular vision system, responsive to the determined change in color of the illuminated indicator, alerts the driver of the equipped vehicle.

15. The vehicular vision system of claim 1, wherein the vehicular vision system ignores traffic lights of the plurality of traffic lights that are not identified to be the target traffic light.

16. The vehicular vision system of claim 1, wherein the status of the identified target traffic light comprises a status of an illuminated indicator of the identified target traffic light, and wherein the status of the illuminated indicator comprises at least one from the group consisting of (i) a color of the illuminated indicator and (ii) an arrow of the illuminated indicator.

17. The vehicular vision system of claim 1, wherein the identified target traffic light comprises one selected from the group consisting of (i) a left turn indicator for a left turn traffic lane of the road, (ii) a straight through indicator for a traffic lane that crosses the intersection and (iii) a right turn indicator for a right turn traffic lane of the road, and wherein other traffic lights of the plurality of traffic lights comprise at least one other selected from the group consisting of (i) the left turn indicator for a left turn traffic lane of the road, (ii) the straight through indicator for a traffic lane that crosses the intersection and (iii) the right turn indicator for a right turn traffic lane of the road.

18. The vehicular vision system of claim 1, wherein the vehicular vision system controls speed of the equipped vehicle via controlling braking of the equipped vehicle.

19. A vehicular vision system, the vehicular vision system comprising:

a camera disposed at a windshield of a vehicle equipped with the vehicular vision system, the camera viewing at least forward of the equipped vehicle through the windshield of the equipped vehicle;

wherein the camera is operable to capture image data;

wherein the camera comprises a CMOS imaging array, and wherein the CMOS imaging array comprises at least one million photosensors arranged in rows and columns;

an electronic control unit (ECU) comprising electronic circuitry and associated software;

wherein image data captured by the camera is transferred to the ECU;

wherein the electronic circuitry of the ECU comprises at least one image processor;

wherein the ECU is operable to process image data captured by the camera and transferred to the ECU;

wherein, as the vehicle travels along a traffic lane of a road, the vehicular vision system, (i) via processing at the ECU of image data captured by the camera and (ii) based on map data, determines presence of a plurality of traffic lights at an intersection that the equipped vehicle is approaching, and wherein each traffic light of the plurality of traffic lights is associated with one or more traffic lanes of the road at the intersection;

wherein the vehicular vision system determines a first relevancy score based on processing at the ECU of image data captured by the camera and a first confidence value associated with the first relevancy score;

wherein the vehicular vision system, based on the map data, determines a curvature of the road;

wherein the vehicular vision system based on the determined curvature of the road, determines a second relevancy score and a second confidence value associated with the second relevancy score;

wherein the vehicular vision system, based on the first relevancy score and the second relevancy score, determines an aggregated relevancy score by weighting the first relevancy score and the second relevancy score, wherein a higher weight is applied to the first relevancy score or the second relevancy score based on the first confidence value and the second confidence value;

wherein the vehicular vision system, based at least in part on the aggregated relevancy score, identifies a target traffic light from the plurality of traffic lights that is associated with the traffic lane along which the equipped vehicle is traveling as the vehicle approaches the intersection;

wherein the vehicular vision system determines a status of the identified target traffic light via processing at the ECU of image data captured by the camera; and wherein the vehicular vision system, responsive to determining the status of the identified target traffic light, performs at least one selected from the group consisting of (i) alerting a driver of the equipped vehicle of status of the target traffic light and (ii) controlling speed of the equipped vehicle.

20. The vehicular vision system of claim 19, wherein the vehicular vision system determines the first relevancy score based at least in part on (i) a longitudinal distance of the target traffic light from the equipped vehicle and (ii) a lateral distance of the target traffic light from the equipped vehicle.

21. The vehicular vision system of claim 19, wherein the vehicular vision system determines the first relevancy score based at least in part on vehicle dynamics data.

22. The vehicular vision system of claim 19, wherein the vehicular vision system determines the second relevancy score based at least in part on global positioning system data.

23. The vehicular vision system of claim 19, wherein the vehicular vision system determines the second relevancy score based at least in part on a longitudinal distance between the equipped vehicle and the intersection.

24. The vehicular vision system of claim 19, wherein the vehicular vision system determines topology information for the traffic lane based on processing at the ECU of image data captured by the camera, and wherein the first relevancy score is further based on the topology information.

25. The vehicular vision system of claim 19, wherein the vehicular vision system determines the aggregated relevancy score by weighting the first relevancy score and the second relevancy score.

26. The vehicular vision system of claim 19, wherein the vehicular vision system, based on the aggregated relevancy score and vehicle dynamics data, determines at least one selected from the group consisting of (i) a stopping distance for the equipped vehicle that will stop the vehicle prior to entering the intersection and (ii) an amount of time remaining until the equipped vehicle will enter the intersection.

27. A vehicular vision system, the vehicular vision system comprising:

a camera disposed at a windshield of a vehicle equipped with the vehicular vision system, the camera viewing at least forward of the equipped vehicle through the windshield of the equipped vehicle;

wherein the camera is operable to capture image data;

wherein the camera comprises a CMOS imaging array, and wherein the CMOS imaging array comprises at least one million photosensors arranged in rows and columns;

an electronic control unit (ECU) comprising electronic circuitry and associated software;

wherein image data captured by the camera is transferred to the ECU;

wherein the electronic circuitry of the ECU comprises at least one image processor;

wherein the ECU is operable to process image data captured by the camera and transferred to the ECU;

wherein, as the vehicle travels along a traffic lane of a road, the vehicular vision system, (i) via processing at the ECU of image data captured by the camera and (ii) based on map data, determines presence of a plurality of traffic lights at an intersection that the equipped vehicle is approaching, and wherein each traffic light of the plurality of traffic lights is associated with one or more traffic lanes of the road at the intersection;

wherein the vehicular vision system, based on processing at the ECU of image data captured by the camera, determines a first relevancy score and a first confidence value associated with the first relevancy score;

wherein the vehicular vision system, based on the map data, determines a curvature of the road;

wherein the vehicular vision system, based on the determined curvature of the road, determines a second relevancy score and a second confidence value associated with the second relevancy score;

wherein the vehicular vision system, based on the first relevancy score and the second relevancy score, determines an aggregated relevancy score by weighting the first relevancy score and the second relevancy score, wherein a higher weight is applied to the first relevancy score or the second relevancy score based on the first confidence value and the second confidence value;

wherein the vehicular vision system, based at least in part on the aggregated relevancy score, identifies a target traffic light from the plurality of traffic lights that is associated with the traffic lane along which the equipped vehicle is traveling as the vehicle approaches the intersection;

wherein the vehicular vision system determines a color of an illuminated indicator of the identified target traffic light via processing at the ECU of image data captured by the camera; and wherein the vehicular vision system, responsive to determining the color of the illuminated indicator, alerts a driver of the equipped vehicle of the color of the illuminated indicator.

28. The vehicular vision system of claim 27, wherein the alert comprises at least one selected from the group consisting of (i) a visual notification, (ii) an audible notification and (iii) a haptic notification.

29. The vehicular vision system of claim 28, wherein the alert comprises the visual notification, and wherein the visual notification includes the color of the illuminated indicator of the identified target traffic light.

30. The vehicular vision system of claim 27, wherein the vehicular vision system determines a change in the color of the illuminated indicator associated with the identified target traffic light, and wherein the vehicular vision system, responsive to the determined change in the color of the illuminated indicator, generates a second alert for the driver of the equipped vehicle.

\* \* \* \* \*